United States Patent [19]

Truskalo et al.

[11] Patent Number: 4,683,405
[45] Date of Patent: Jul. 28, 1987

[54] PARABOLIC VOLTAGE GENERATING APPARATUS FOR TELEVISION

[75] Inventors: Walter Truskalo, Titusville; Thomas F. Nolan, Wrightstown, both of N.J.

[73] Assignee: RCA Corporation, Princeton, N.J.

[21] Appl. No.: 879,304

[22] Filed: Jun. 27, 1986

[51] Int. Cl.$^4$ ............................................. H01J 29/56
[52] U.S. Cl. ................................... 315/371; 315/368; 315/382
[58] Field of Search ...................... 315/368, 371, 382

[56] References Cited

U.S. PATENT DOCUMENTS 3,422,306  5/1965  Gray .
4,230,972 10/1980  Bafaro .
4,258,298  3/1981  Hilburn et al. .
4,318,033  3/1982  Eames, Jr. ............................ 315/382

OTHER PUBLICATIONS

A Data Sheet for an IC ICL8038 Made by Intersil Co.

Primary Examiner—Theodore M. Blum
Assistant Examiner—David Cain
Attorney, Agent, or Firm—Eugene M. Whitacre; Joseph J. Laks; Sammy S. Henig

[57] ABSTRACT

A dynamic focus voltage generating circuit for television generates a parabolic voltage at the horizontal rate that is responsive to a synchronizing signal. The parabolic voltage is generated from a sawtooth waveform having an upramping portion, a downramping portion and a flat portion such that only the length of the flat portion of the sawtooth waveform varies when the frequency of the synchronizing signal changes.

11 Claims, 10 Drawing Figures

PARABOLIC VOLTAGE GENERATING APPARATUS FOR TELEVISION

This invention relates to a television apparatus that generates a parabolic voltage coupled to, for example, a focus electrode of a cathode ray tube (CRT), for controlling the size of the beam spot on the CRT screen.

The need for electron beams control voltage such as, for example, focus voltage control is well understood in the art. It was experienced early in television apparatus as an incident to the scanning of a CRT because the distance from the center of deflection to the scanned raster is not uniform. Actually, that distance varies markedly as the beam is deflected horizontally and vertically from the central portion of the screen and, consequently, defocusing is most severe at the corners of the raster. The adoption of picture tubes of increased size and wider deflection angles in recent years has emphasized the defocusing effect at the corners of the scanning pattern.

Efforts have been made to control a focus or an astigmatizm error in electrostatically controlled tubes by changing the magnitude of the potential of the corresponding electrode of the CRT with displacement of the beam from the center of the raster. When this technique is used for controlling, for example, the focus electrode, it is referred to as dynamic focusing. It comprises the application of unidirectional potential to the focus electrode of the electrostatically focused cathode-ray tube to establish the proper focus condition at the center of the raster and the concurrent application of a suitably varying potential to preserve that condition throughout the scanning raster. Since, in the usual case, the beam focus changes approximately in accordance with a parabolic function along either scanning direction, the varying components of focus potential may include parabolic waveforms in both axes.

Although the discussion herein relates to the focus electrode of the CRT, it should be understood that other types of beam control electrodes of the CRT may require a voltage that varies as a function of horizontal and vertical displacement of the electron beam to provide dynamic control of the spot size on the screen of the CRT.

FIG. 1 illustrates an example of focus voltage requirements at key positions on the screen of a 19", 110° CRT for obtaining optimum spot size of the electron beam. The key positions on the CRT screen, selected for illustration purposes, are the top, bottom, sides, center, and corners of the screen. The center of the screen defines the reference point. The other points provide the corresponding voltage deviations from the reference point required to obtain the optimum beam spot size. Accordingly, during scanning of either the top or bottom scan lines, the focus voltage is required to vary by approximately 250 volts; whereas, during scanning the center line, the focus voltage is required to vary by approximately 300 volts.

Variation of the focus voltage may be accomplished by supplying a parabolic first voltage at the horizontal rate having a peak-to-peak amplitude that is modulated in a vertical rate, parabolic manner. The amplitude of a parabolic waveform at a horizontal line rate $f_H$ is modulated by a second parabolic waveform at a vertical rate. The modulation polarity may be such that, for example, the minimum amplitude of the modulated waveform would be at both ends of the vertical parabola shown in FIG. 2. A vertical parabolic waveform and a horizontal parabolic waveform having corresponding constant amplitudes are then added to the modulated waveform first voltage to produce the dynamic focus voltage of FIG. 2.

The parabolic waveform at the horizontal rate, for example, includes a parabolic upramping portion and a parabolic downramping portion such that the rate of change at the transition point from one of the upramping and the downramping portions to the other one is substantially zero.

It may be desirable to synchronize both the upramping and downramping portions to a synchronizing signal such that the length of one is not dependent on the length of the other one.

In accordance with an aspect of the invention, a video apparatus responsive to a periodic synchronizing signal at a frequency that is related to a deflection frequency is used for generating a parabolic first signal synchronized to synchronizing signal. A sawtooth waveform is generated having, during a given period of the sawtooth waveform, an upramping portion, a downramping portion and a substantially flat portion. The length of the flat portion varies when a change occurs in the length of the period of the synchronizing signal such that the length of each of the downramping and upramping portions is not affected. The length of the given period of the sawtooth waveform is determined in accordance with the length of the period of the synchronizing signal. The sawtooth waveform is synchronized to the synchronizing signal. Corresponding portions of the parabolic first signal are generated from the upramping and downramping portions.

Figure 3:
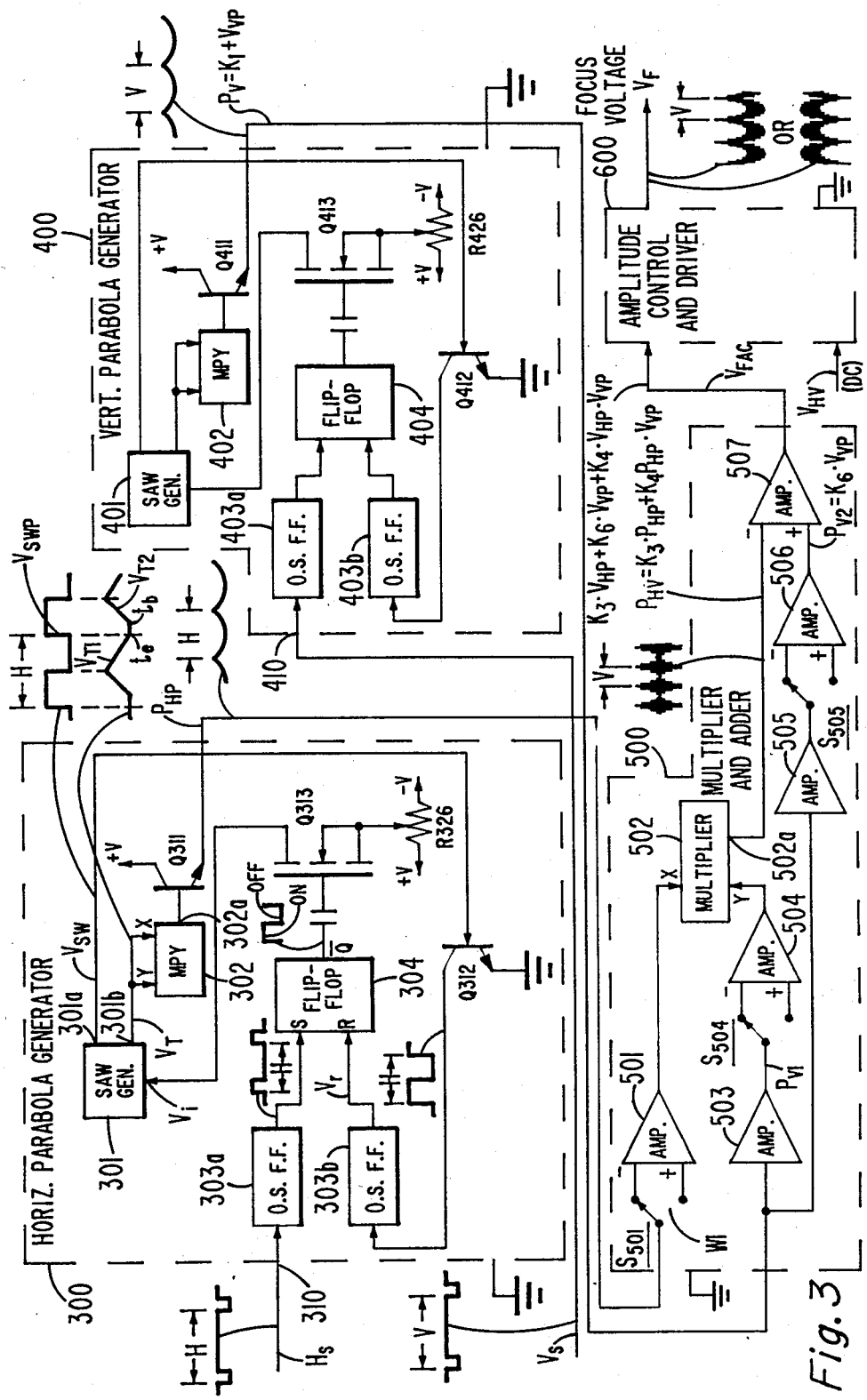
FIG. 3 illustrates a block diagram of a focus voltage generating circuit, embodying the invention, that generates the focus voltage of FIG. 2.

Referring to FIG. 3, a periodic horizontal sync signal $H_s$ and a periodic vertical sync signal $V_s$ having periods H and V, respectively, are coupled from a source that is not shown to corresponding input terminals 310 and 410 of a horizontal parabola generator 300 and of a vertical parabola generator 400, respectively. Generator 300, embodying an aspect of the invention, generates a parabolic waveform signal $P_H$ having the period H that is synchronized to signal $H_s$. Similarly, generator 400, embodying another aspect of the invention, generates a parabolic waveform signal $P_V$ having the period V that is synchronized to signal $V_s$. The source of signals $H_s$ and $V_s$ may include a sync separator of a video display that separates signals $H_s$ and $V_s$ from an incoming composite video signal and that adjusts the corresponding delays of separated sync signals $H_s$ and $V_s$.

Horizontal parabola generator 300 includes a sawtooth waveform generator 301 which comprises, for example, a monolithic integrated circuit ICL 8038 made by Intersil Co. that generates at a terminal 301b a triangle waveform signal $V_T$. FIGS. 4a–4f illustrate waveforms useful in explaining the operation of generator 300 of FIG. 3. Similar numbers and symbols in FIGS. 3 and 4a–4f illustrate similar items or functions.

The free running frequency of signal $V_T$ of generator 301 of FIG. 3 is adjusted to be slightly higher than the frequency of signal $H_s$. This allows an oscillator that is included in generator 301 to complete each horizontal rate cycle between each pair of consecutively provided synchronizing pulses of signal $H_s$.

Figure 4:
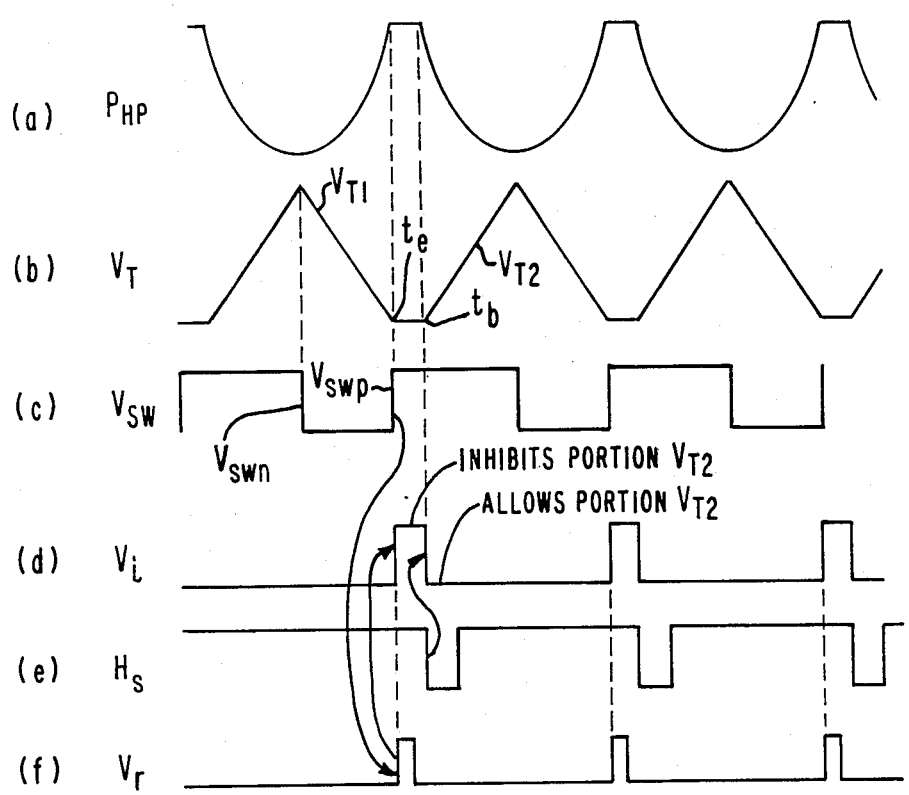
FIGS. 4a–4f illustrate waveforms useful in explaining the operation of the circuit of FIG. 3.

The completion of a given horizontal rate cycle of signal $V_T$ of FIG. 4b occurs at a time $t_e$. Time $t_e$ occurs at the end of a downramping portion $V_{T1}$ of signal $V_T$. At time $t_e$, at the end of portion $V_{T1}$, a positive signal transition $V_{swp}$ of a square wave signal $V_{SW}$ of FIG. 4c that is supplied at an output terminal 301a of generator 301 of FIG. 3 is generated. A negative signal transition $V_{swn}$ of signa $V_{SW}$ of FIG. 4c occurs at the beginning time of portion $V_{T1}$ of FIG. 4b. Signal $V_{SW}$ of FIG. 3 is inverted and amplified by an inverter stage Q312. Signal transition $V_{swp}$ of FIG. 4b is converted to a fixed narrow pulse $V_r$ of FIG. 4f by a one shot multivibrator 303b of FIG. 3. Pulse $V_r$ is coupled to a "reset" input terminal of a flip-flop 304 causing a signal at an output terminal $\overline{Q}$ of flip-flop 304 to assume an "on" state. Pulse $V_r$ occurs immediately following time $t_e$ of FIG. 4b as shown in FIG. 4f.

Output terminal $\overline{Q}$ of flip-flop 304 of FIG. 3 is AC-coupled to a gate electrode of a transistor Q313. A first main current conducting electrode of transistor Q313 is coupled to a variable resistor R326. Resistor R326 establishes the level of a signal $V_i$ at a second main current conducting electrode of transistor Q313 when the signal at terminal $\overline{Q}$ of flip-flop 304 is at the "on" state. The AC coupling provides an easy method to level-shift the signal at terminal $\overline{Q}$ of flip-flop 304 to form signal $V_i$ at the second main current conducting electrode of transistor Q313. As long as transistor Q313 is turned on, that occurs when the signal at output terminal $\overline{Q}$ is at the "on" state, transistor Q313 causes signal $V_i$ to be at a corresponding level that prevents signal $V_T$ from upramping. Signal $V_T$ remains flat, or at the same level, until the next synchronizing pulse of signal $H_s$ occurs. When the pulse of signal $H_s$ occurs, one shot multivibrator 303a generates a fixed duration, narrow, pulse that is coupled to a "set" input terminal of flip-flop 304, causing the signal at output terminal $\overline{Q}$ of flip-flop 304 to assume an "off" state. The result is that transistor Q313 is turned off. When transistor Q313 is turned off, it causes signal $V_i$ of FIG. 4d to be at a level that allows sawtooth waveform generator 301 of FIG. 3 to free run for the next cycle, so as to form upramping portion $V_{T2}$ of signal $V_T$ of FIG. 4b that is subsequently followed by downramping portion $V_{T1}$. Thus, for example, a beginning time $t_b$ of upramping portion $V_{T2}$ is determined by the timing of signal $H_s$ of FIG. 4e; whereas, the lengths of each of portions $V_{T1}$ and $V_{T2}$ of FIG. 4b, that are substantially equal, are constant and are independent of the period H of signal $H_s$. The duration of the flat portion during interval $t_e-t_b$ of FIG. 4b increases when the frequency of signal $H_s$ of FIG. 4e decreases, and vice versa such that the period of signal $V_T$ is equal to period H and such that signal $V_T$ of FIG. 3 is synchronized to signal $H_s$.

In accordance with a further aspect of the invention, advantageously, the AC coupling of terminal $\overline{Q}$ to the gate electrode of transistor Q313 allows the oscillator of generator 301 to free-run continuously when the synchronizing pulses of signal $H_s$ do not occur, because, when the signal at terminal $\overline{Q}$ of flip-flop 304 is constant, transistor Q313 remains turned off. Such free-run is desirable for maintaining the parabolic voltage even when no incoming television signal is received.

Triangle waveform signal $V_T$ is coupled both to an input X and to an input Y of a multiplier unit 302 to provide the multiplicand and multiplier, respectively, that may be identical. As a result of the multiplication operation of multiplier unit 302, a product signal 302a of multiplier unit 302 has a parabolic waveform at the horizontal rate. Portions $V_{T1}$ and $V_{T2}$ form corresponding portions of a given parabolic cycle of signal 302a. An emitter follower transistor Q311 couples signal 302a to form a horizontal rate parabolic signal $P_{HP}$ at a constant amplitude that is coupled to a wiper W1 of a switch $S_{501}$. Wiper W1 couple, in accordance with the selected position thereof, signal 302a of FIG. 4a that is parabolic to either an inverting or a noninverting input terminal of a controllable gain device, or an amplifier 501 of a multiplier and adder unit 500 of FIG. 3. An output terminal 502a of amplifier 501 is coupled to an input terminal X of a modulator, or multiplier unit 502. Switch $S_{501}$ is used for selecting the required polarity of the signal at input terminal X of multiplier unit 502.

Figure 5:
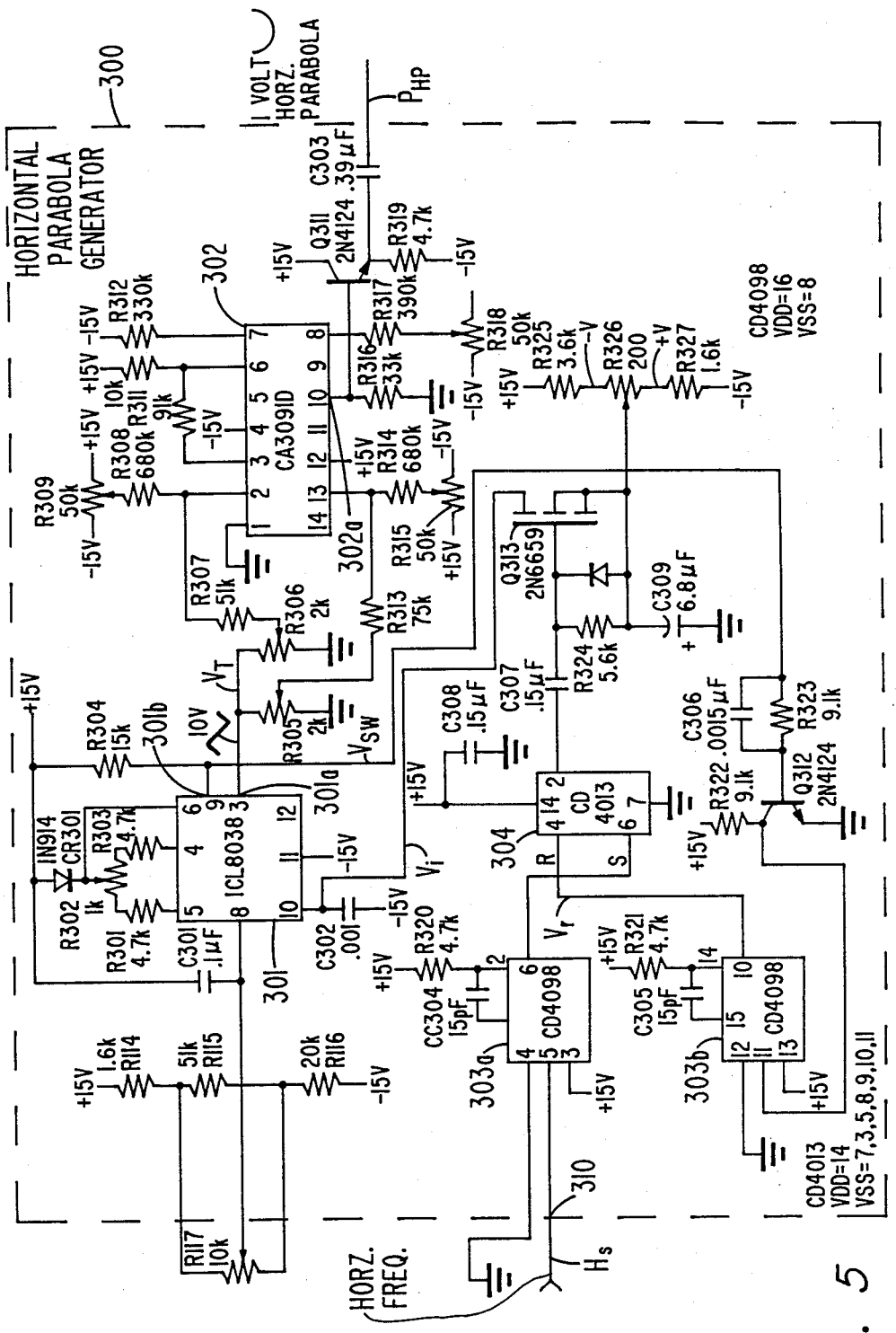
FIG. 5 illustrates a detail diagram of a parabolic voltage generating circuit embodying the invention.

FIG. 5 illustrates a detailed schematic diagram of horizontal parabola generator 300 of FIG. 3. Similar items and symbols in FIGS. 2, 3, 4a–4f and 5 illustrate similar items or functions. A variable resistor R117 of FIG. 5 controls the sum of the lengths of portions $V_{T1}$ and $V_{T2}$ of triangle waveform $V_T$; thus, resistor R117 adjusts the free running frequency of signal $V_T$. A variable resistor R302 controls the ratio between the lengths of portions $V_{T2}$ and $V_{T1}$. By using variable resistors R117 and R302, the length of portion $V_{T1}$ can be adjusted irrespective of that of portion $V_{T2}$, and vice versa; thus, advantageously, parabolic signal $P_{HP}$ may be adjusted to be symmetrical or asymmetrical relative to the center of trace to the extent required for the focus voltage for the particular CRT that is used.

A vertical parabola generator 400, embodying another aspect of the invention, operates in a similar manner to that of horizontal parabola generator 300 except that it generates a parabolic signal $P_V$ that includes a parabola signal $V_{VP}$ at the vertical frequency summed with a constant DC level. Output signal $P_V$ of vertical parabola generator 400 having a constant amplitude is coupled to both input terminals of controllable gain devices, or amplifiers 503 and 505.

A vertical parabola signal $P_{V1}$ at an output terminal of amplifier 503 is coupled through a switch $S_{504}$ either to an inverting or to a noninverting input terminal of a controllable gain device, or an operational amplifier 504 having an output terminal that is coupled to an input terminal Y of multiplier unit 502. Switch $S_{504}$ determines the polarity of the signal at terminal Y of multiplier unit 502.

Multiplier unit 502 generates by multiplying the signals at input terminal X and Y, respectively, a signal $P_{HV}$. Signal $P_{HV}$ contains the sum of two terms. The first term is equal to a controllable constant $K_3$ multiplied by horizontal rate parabolic signal $P_{HP}$. Thus, the first term is parabolic at the horizontal rate with a peak-to-peak amplitude that is constant. The second term is equal to a controllable constant $K_4$ multiplied by the product of signals $P_{HP}$ and $V_{VP}$. Thus, the second term is parabolic at the horizontal rate having a peak-to-peak amplitude that varies, or that is modulated, in a vertical rate parabolic manner. Sign $P_{HV}$ that is the sum of the first and second terms is coupled to an inverting input terminal of a summing amplifier 507.

Parabolic signal $P_V$ that is at the vertical rate is coupled via amplifier 505, a switch $S_{505}$ and an amplifier 506 to a noninverting input terminal of amplifier 507 to form there a signal $P_{V2}$. Signal $P_{V2}$ is equal to a controllable constant $K_6$ multiplied by signal $V_{VP}$. Thus, signal $P_{V2}$ having a constant amplitude is parabolic at the vertical rate.

Amplifier 507 generates an output signal $V_{FAC}$ that is equal to the sum: $K_6 \times$ signal $V_{VP} + K_3 \times$ signal $P_{HP} + K_4 \times$ signal $P_{HP} \times$ signal $V_{VP}$. The first term of signal $V_{FAC}$ is parabolic at the vertical rate with a constant amplitude. The second term is parabolic at the horizontal rate with a constant amplitude; the third term is parabolic at the horizontal rate having a peak-to-peak amplitude that is modulated at the vertical rate and having a phase that is substantially independent of vertical rate signal $P_{V2}$. The first term causes that the average value of signal $V_{FAC}$ varies in a parabolic manner at the vertical rate.

Figure 1:
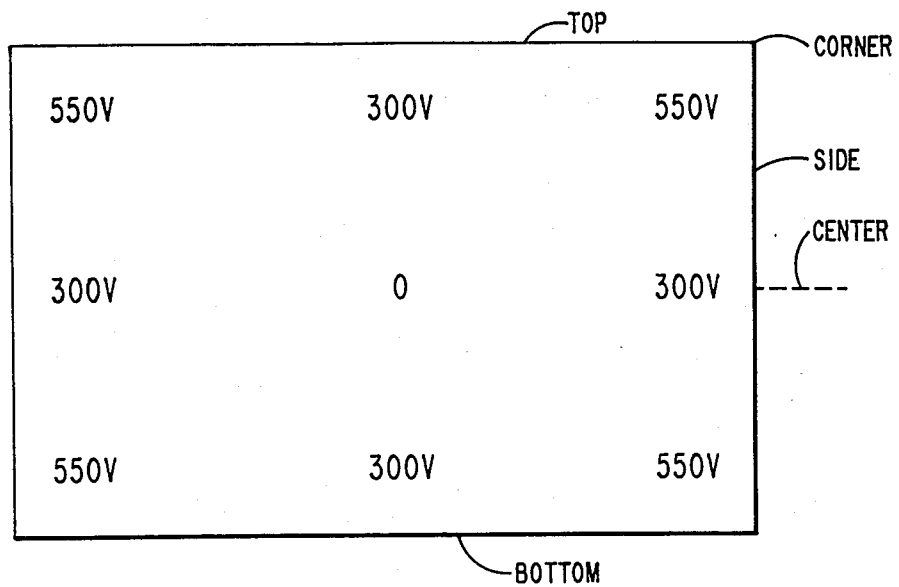
FIG. 1 illustrates the focus voltage waveform required at key locations of a CRT screen.
Figure 2:
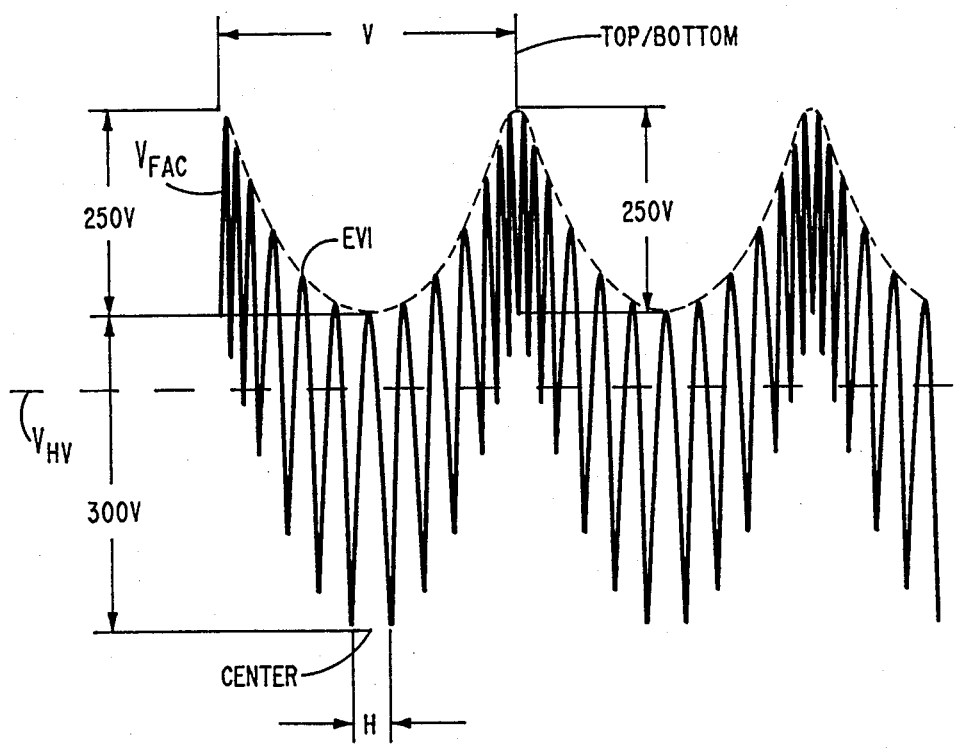
FIG. 2 illustrates an example of a waveform of a dynamic focus voltage.

Switches $S_{501}$, $S_{504}$ and $S_{505}$ control the polarity or phase, of each of the first second and third terms signal $V_{FAC}$. Thus, FIG. 2 represents signal $V_{FAC}$, resulting from a given arrangement of the switches. Signal $V_{FAC}$ of FIG. 3 is summed, in a conventionally built amplitude control and driver circuit 600, with a DC high voltage $V_{HV}$ to form an output voltage $V_F$ that is coupled to an electrode of a CRT, not shown in the FIGURES, such as, for example, the focus electrode.

An example of the waveform of signal $V_{FAC}$ is shown in FIG. 2. Note that an envelope EV1 of signal $V_{FAC}$ varies in a vertical rate parabolic manner. Additionally, the peak-to-peak amplitudes of the horizontal rate cycles of signal $V_{FAC}$ vary, or are being modulated at the vertical rate.

What is claimed:

1. A video apparatus responsive to a periodic synchronizing signal at a frequency that is related to a deflection frequency for generating a parabolic first signal synchronized to said synchronizing signal, comprising:

means responsive to said synchronizing signal for generating a sawtooth waveform having, during a given period of said sawtooth waveform, an upramping portion, a downramping portion and a substantially flat portion;

means responsive to said synchronizing signal and coupled to said sawtooth waveform generating means for varying the length of said flat portion when a change occurs in the length of the period of said synchronizing signal without affecting the length of each of said downramping and upramping portions such that the length of said given period of said sawtooth waveform is determined in accordance with the length of the period of said synchronizing signal and such that said sawtooth waveform becomes synchronized to said synchronizing signal; and means responsive to said sawtooth waveform for generating from said upramping and downramping portions corresponding portions of said parabolic first signal.

2. An apparatus according to claim 1 further comprising, means for generating a control signal at a first level after one of said downramping and upramping portions has attained a predetermined level, said control signal being coupled to a control terminal of said sawtooth waveform generating means for causing said sawtooth waveform to remain substantially constant as long as said control signal is at said first level to form said flat portion and for preventing each of said upramping and downramping portions from occurring as long as said control signal is at said first level, and means responsive to said synchronizing signal and coupled to said control signal generating means for changing said control signal to be at a second level that causes one of said upramping and downramping portions to occur following the occurrence of said synchronizing signal.

3. An apparatus according to claim 2 wherein said control signal generating means comprises a flip-flop having an output signal that assumes a first state when one of said downramping and upramping portions has attained said predetermined level and that assumes a second state when said synchronizing signal occurs to generate said control signal at said first and second levels, respectively.

4. An apparatus according to claim 1 wherein said sawtooth waveform generating means is capable of generating said upramping and downramping portions with substantially equal lengths.

5. An apparatus according to claim 1 further comprising means for controlling the sum of the lengths of said upramping and downramping portions and means for controlling the ratio between the length of said downramping and that of said upramping portion.

6. A video display apparatus according to claim 1 further comprising means for generating a generally parabolic second signal at a second frequency, and a multiplier responsive to said first and second signals for multiplying said first and second signals to generate said control voltage from a product signal that is produced by said multiplier and that is in accordance with the product of said first and second signals.

7. An apparatus according to claim 1 further comprising means responsive to said product signal and to said first signal for combining the two signals to generate a focus voltage that is coupled to a focus electrode of a cathode ray tube of said display apparatus.

8. An apparatus according to claim 7 wherein said combining means comprises an adder.

9. An apparatus according to claim 7 further comprising means responsive to said first, second and product signals for combining the three signals to generate said focus voltage.

10. An apparatus according to claim 9 wherein said combining means comprises an adder that adds the three signals to generate said focus voltage.

11. An apparatus according to claim 7 wherein said first signal is at a horizontal rate and said second signal is at a vertical rate.

* * * * *